United States Patent [19]

Hirai

[11] Patent Number: 5,349,448
[45] Date of Patent: Sep. 20, 1994

[54] IMAGE COMMUNICATION APPARATUS

[75] Inventor: Nobuyuki Hirai, Yokohama, Japan

[73] Assignee: Canon Kabushiki Kaisha, Tokyo, Japan

[21] Appl. No.: 894,281

[22] Filed: Jun. 4, 1992

[30] Foreign Application Priority Data

Jun. 4, 1991 [JP] Japan .................. 3-132698

[51] Int. Cl.⁵ ............ H04N 1/00; H04M 1/00
[52] U.S. Cl. ................. 358/444; 358/500; 358/434; 365/230.01
[58] Field of Search ............. 358/256, 257, 263, 261, 358/434, 442, 443, 444, 402, 401, 409, 480, 489, 375, 403, 407, 440, 406, 400, 437; 307/10.2, 9.1; 382/1; 365/230; 353/26 A; 395/111, 101, 143, 275

[56] References Cited

U.S. PATENT DOCUMENTS

| | | | |
|---|---|---|---|
| 4,224,690 | 9/1980 | Rockwell | 371/25 |
| 4,587,640 | 5/1986 | Saitoh | 365/229 |
| 4,628,484 | 12/1986 | Hattori | 365/52 |
| 4,718,044 | 1/1988 | Matsuyama | 365/230 |
| 4,792,869 | 12/1988 | Fujita | 360/69 |
| 4,827,349 | 5/1989 | Ogata et al. | 358/256 |
| 4,835,375 | 5/1989 | Shimamura et al. | 235/479 |
| 4,837,712 | 6/1989 | Shibamiya | 364/523 |
| 4,849,944 | 7/1989 | Matsushita | 371/21 |
| 4,869,184 | 9/1989 | Hisatake et al. | 112/121.12 |
| 4,900,902 | 2/1990 | Sakakibara | 235/375 |
| 4,910,785 | 3/1990 | Nakatsuma | 382/9 |
| 4,942,461 | 7/1990 | Abe et al. | 358/75 |
| 5,020,022 | 5/1991 | Shibamiya | 364/900 |
| 5,115,273 | 5/1992 | Ujiie et al. | 355/209 |
| 5,237,644 | 8/1993 | Shinohara | 395/111 |
| 5,239,385 | 8/1993 | Ejiri | 358/434 |

Primary Examiner—Paul Ip
Attorney, Agent, or Firm—Fitzpatrick, Cella, Harper & Scinto

[57] ABSTRACT

An image communication apparatus, which stores image data in a first memory, and transfers the image data from the first memory to a detachable external storage medium, includes a detection unit for detecting an insertion/detachment state of the external storage medium, a transfer unit for transferring image data in the external storage medium to the first memory upon insertion of the external storage medium, and a delete unit for deleting the same image data stored in the first memory as the image data stored in the external storage medium upon detachment of the external storage medium.

10 Claims, 7 Drawing Sheets

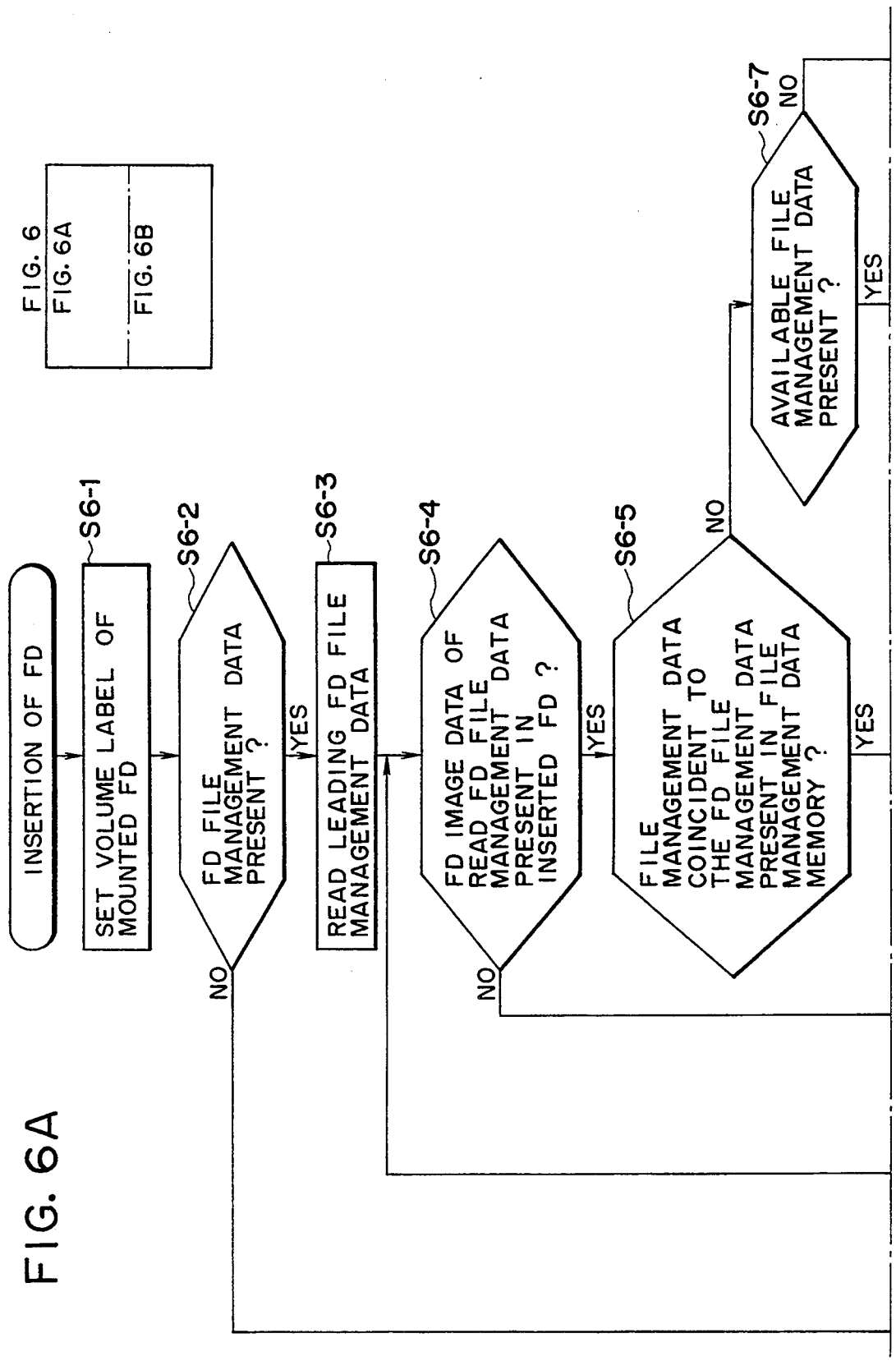

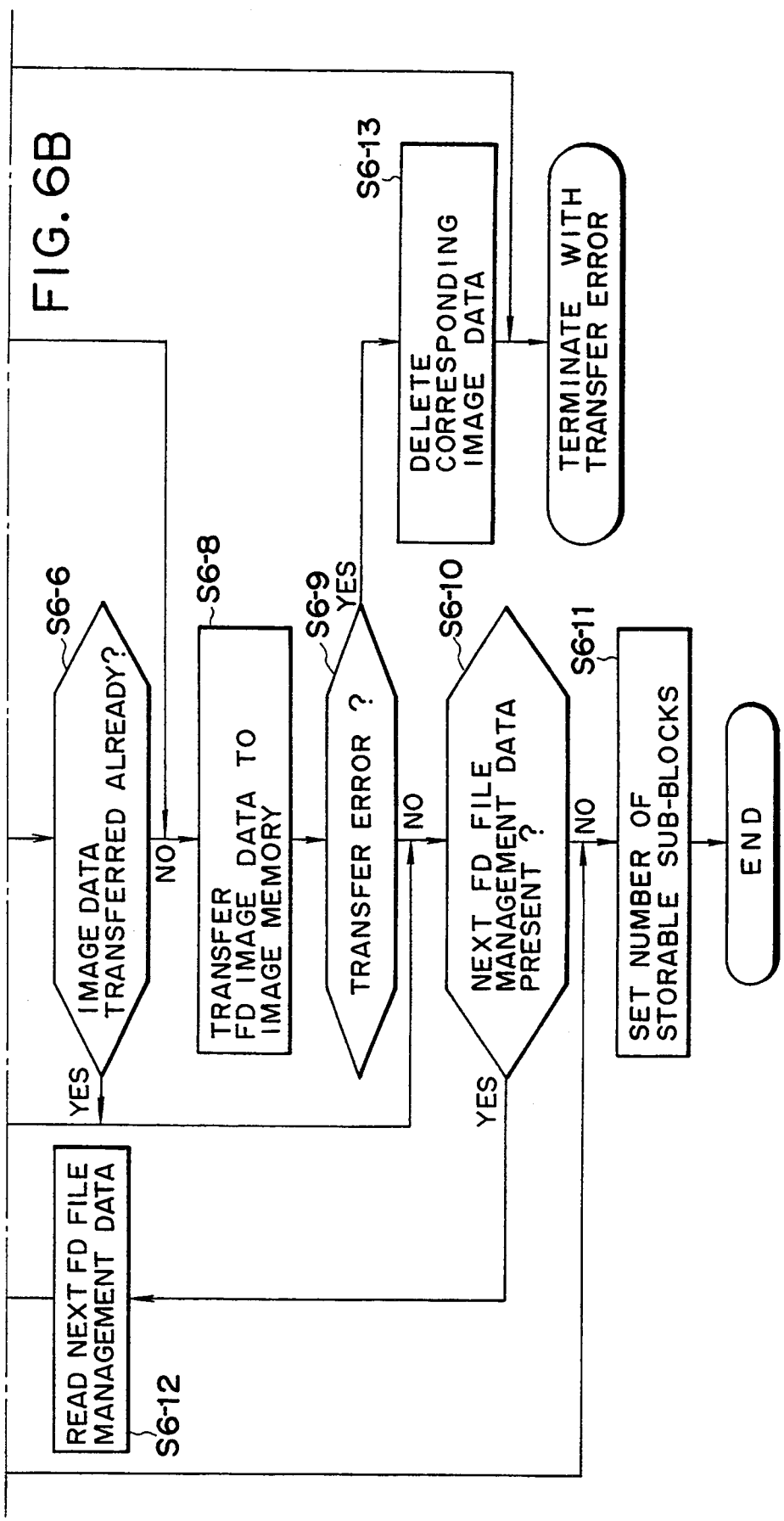

IMAGE COMMUNICATION APPARATUS

BACKGROUND OF THE INVENTION

1. Field of the Invention

The present invention relates to an image communication apparatus, which has a detachable external storage medium, and stores image data in external storage medium.

2. Related Background Art

In a conventional facsimile apparatus, a semiconductor memory is known as a storage medium for storing image data. Recently, as storage media which can hold data while a power supply is OFF, a hard disk, a floppy disk (to be referred to as an FD hereinafter), and the like are used.

Of these storage media, when a low-speed storage medium such as an FD is used, image data is temporarily stored in a high-speed storage medium (first storage medium) such as a D-RAM, and the stored image data is then transferred to a low-speed storage medium (second storage medium) such as an FD, so that the processing speed of the overall system is not decreased.

After the image data is transferred, the D-RAM holds the image data. When the image data is used, it can be directly read out from the high-speed D-RAM. More specifically, the FD serves as a back-up medium for the D-RAM, which is used when image data stored in the first storage medium is lost due to, e.g., an OFF operation of the power supply.

In the prior art, however, a detached FD is inserted in another facsimile apparatus, so that image data stored in the inserted FD can be transmitted, printed out, and so on. At the same time, since the same image data is held in the D-RAM in the original facsimile apparatus, the image data can be transmitted, printed out, and so on.

In this manner, since the D-RAM and the FD store the same image data, and since the FD is detachable, image access operations such as a transmission operation, a print-out operation, and the like undesirably overlap each other.

As applications associated with an image communication apparatus which stores image data in a detachable storage medium such as an FD, U.S. Pat. Nos. 4,827,349, 4,910,785, and 4,900,902, and U.S. patent application Ser. Nos. 07/269,733, 07/446,479, 07/707,034, and 07/615,149 are known.

However, applications that can solve the above-mentioned problems have not been proposed yet.

SUMMARY OF THE INVENTION

It is an object of the present invention to improve an image communication apparatus in consideration of the above-mentioned problems.

It is another object of the present invention to provide an image communication apparatus, which can efficiently use a memory by deleting the same image data stored in the memory of the apparatus as that stored in an external storage medium while the detachable external storage medium is detached.

It is still another object of the present invention to provide an image communication apparatus, which can improve use efficiency of a memory by transferring image data stored in a detachable external storage medium to the memory of the apparatus upon insertion of the external storage medium, and by deleting the same image data stored in the memory of the apparatus as that stored in the external storage medium upon detachment of the external storage medium.

Other objects of the present invention will become apparent from the following detailed description of the preferred embodiments taken in conjunction with the accompanying drawings.

BRIEF DESCRIPTION OF THE DRAWINGS

FIG. 6 is a flow chart showing insertion processing of the FD 20 in this embodiment.

DETAILED DESCRIPTION OF THE PREFERRED EMBODIMENT

The preferred embodiment of the present invention will be described in detail hereinafter with reference to the accompanying drawings.

Figure 1:
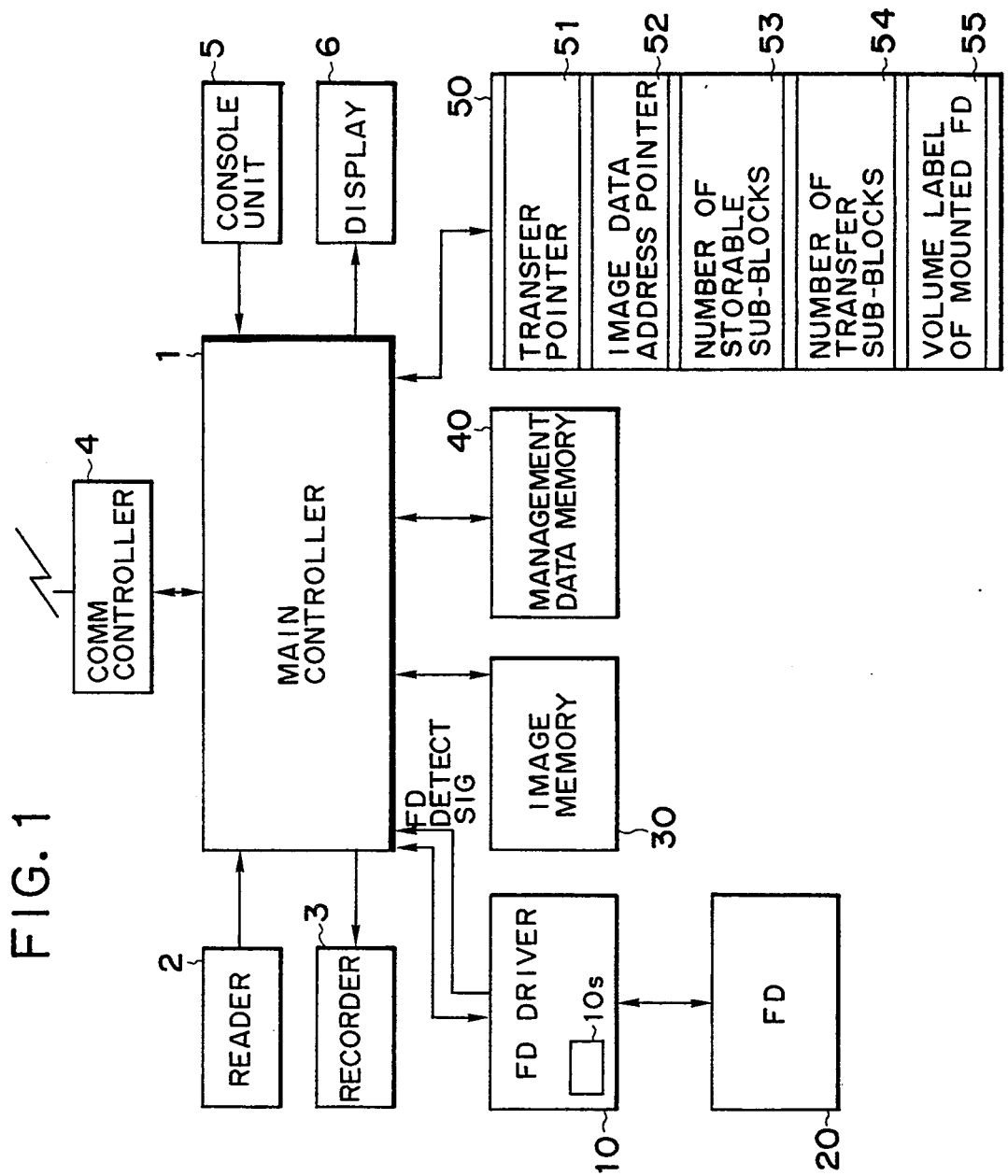
FIG. 1 is a block diagram showing an arrangement of a facsimile apparatus according to an embodiment of the present invention.

FIG. 1 is a block diagram showing an arrangement of a facsimile apparatus according to an embodiment of the present invention.

In FIG. 1, a main controller 1 controls the operation of the overall apparatus, and comprises a microprocessor, a program memory ROM, a work area RAM, and the like.

A reader 2 comprises a CCD image sensor, an original feed mechanism, and the like.

A recorder 3 comprises a thermal printer, an ink-jet printer, a laser printer, or the like.

A communication controller 4 comprises a modem, an NCU (network control unit), and the like.

A console unit 5 comprises, e.g., a keyboard.

A display 6 comprises, e.g., an LCD.

A floppy disk (FD) driver 10 is connected to the main controller 1.

A floppy disk (FD) 20 is detachable from the FD driver 10.

An image data storage memory (to be referred to as an image memory hereinafter) 30 such as a D-RAM is connected to the main controller 1.

An image management data storage memory (to be referred to as a management data memory hereinafter) 40 such as an S-RAM is connected to the main controller 1.

A control data storage memory 50 such as an S-RAM is also connected to the main controller 1.

Figure 2:
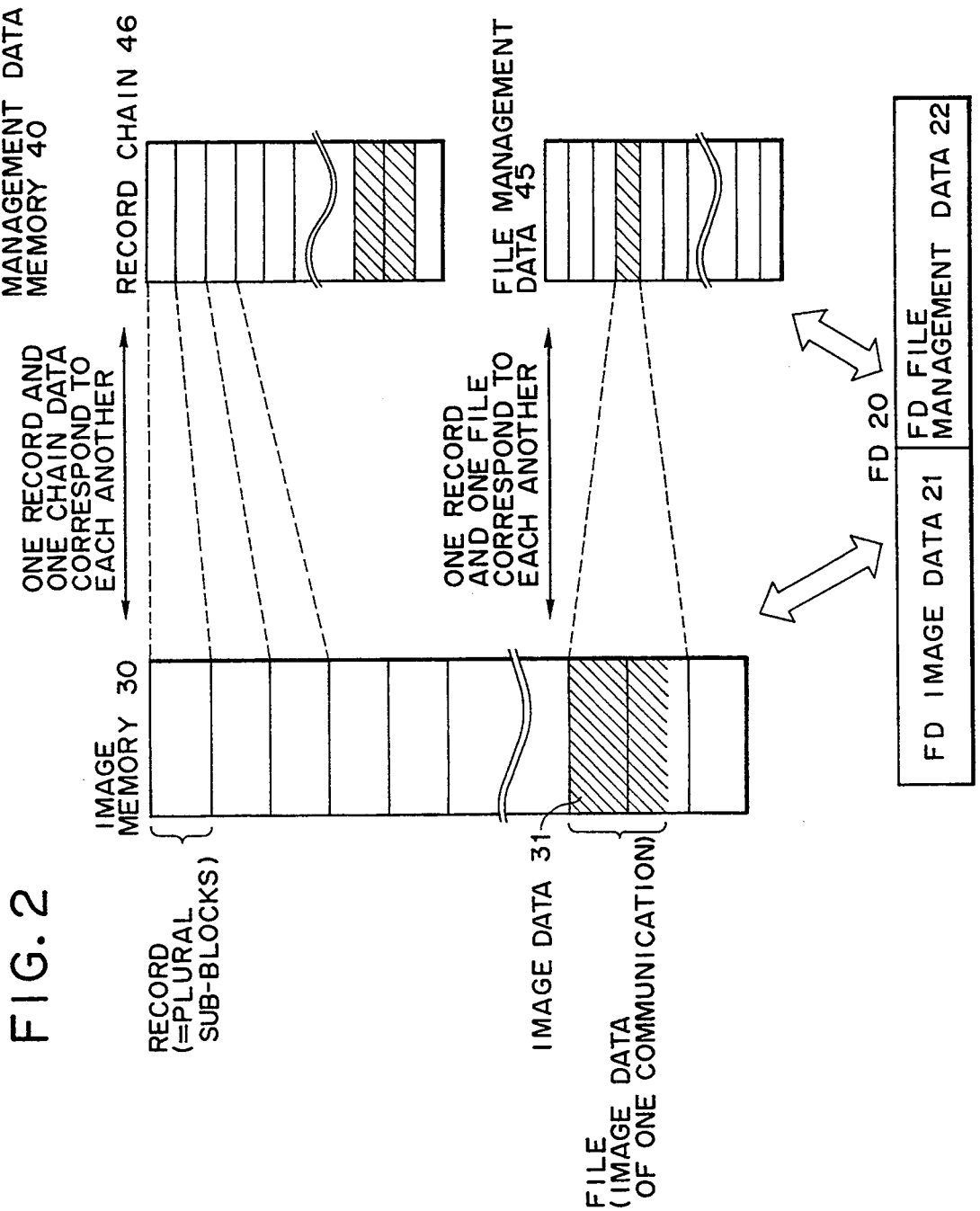
FIG. 2 shows a memory map of this embodiment.

FIG. 2 shows the relationship among the memories in this embodiment.

The image memory 30 is a storage medium for storing image data 31, and is an example of the first storage medium. The image memory 30 is constituted a plurality of main blocks (records) each having a predetermined size, and each main block is constituted by a plurality of sub-blocks each having a predetermined size. The first page of image data of one communication (=file) is stored from the beginning (from the beginning of sub-block number 0) of the main block, and each page in the file is stored from the beginning of a corresponding sub-block. Data transfer with the FD 20 is performed in units of sub-blocks.

The management data memory 40 is a storage medium for storing image management data 41 for managing the image data 31. The image management data 41 includes file management data 45 for managing files, a record chain 46 for managing the records in the image memory 30, and the like.

The file management data 45 stores page data such as a use state of a file in the image memory 30 or the FD 20, the storage start and end positions of pages in the file (block numbers in the image memory 30 or FAT numbers in the FD 20), and the like, a name (to be referred to as a volume label hereinafter) assigned to the FD 20 which stores the corresponding image data, a file name in the FD 20, and the like.

The record chain 46 stores the use states of the records, the presence/absence of the next record, the next record number, and the like in correspondence with the records in the image memory 30.

The FD 20 is a storage medium for storing FD image data 21, and FD file management data 22 for managing the FD image data 21, and is an example of the second storage medium. Note that an area for storing the FD file management data 22 is assured in advance in the FD 20 independently of an area for storing the FD image data 21. The FD file management data 22 is renewed on the basis of the file management data 45 every time the content of the FD 20 is renewed.

The FD driver 10 has an FD detect sensor 10s for detecting the insertion/detachment state of the FD 20, and generating an FD detect signal. The main controller 1 discriminates the insertion/detachment state of the FD 20 on the basis of the FD detect signal from the FD detect sensor 10s.

The control data storage memory 50 is a memory for storing a transfer pointer 51, an image data address pointer 52, the number 53 of storable sub-blocks, the number 54 of transfer sub-blocks, and a volume label 55 of a mounted FD.

The transfer pointer 51 is used when data is transferred from the image memory 30 to the FD 20. The pointer 51 indicates a sub-block which is being transferred or waits for transfer, and is renewed to indicate the next sub-block upon completion of the transfer of the corresponding sub-block.

The image data address pointer 52 indicates an address next to the end address of the image data 31, which is being stored in the image memory 30, i.e., an address at which the image data 31 is to be stored next. Dummy data is stored in this pointer in a state other than the storage operation.

The number 53 of storable sub-blocks is a value obtained by dividing, with the sub-block size, an available (unused) area of the area in the FD 20, which area can be used for storing the FD image data 21 (as described above, the area for storing the FD file management data 22 is excluded in advance). For example, in the case of an FD having the MS-DOS ® format as one of operating systems, the number of storable sub-blocks is calculated by a file allocation table (FAT) as a management data section. The FAT divides the storage area of the FD 20 into blocks each having a given unit size, and stores the use states of the unit blocks and the next unit block number. The number 53 of storable sub-blocks is renewed when the content of the FD 20 is changed due to substitution reception, substitution reception image output, and the like or when the FD 20 itself is changed due to insertion or detachment of the FD 20.

The number 54 of transfer sub-blocks is the number of sub-blocks of the image data 31, which is being stored in the image memory 30, and is to be transferred to the FD 20. The number 54 of transfer sub-blocks is increased every time the sub-block is renewed, while the image data 31 is being stored in the image memory 30. More specifically, the number 54 of transfer sub-blocks indicates the number of sub-blocks which store the image data 31, which is being stored.

The volume label 55 of the mounted FD stores the volume label of the mounted FD 20. This label is renewed when the FD 20 is inserted.

The operation of this embodiment will be described below.

Figure 3:
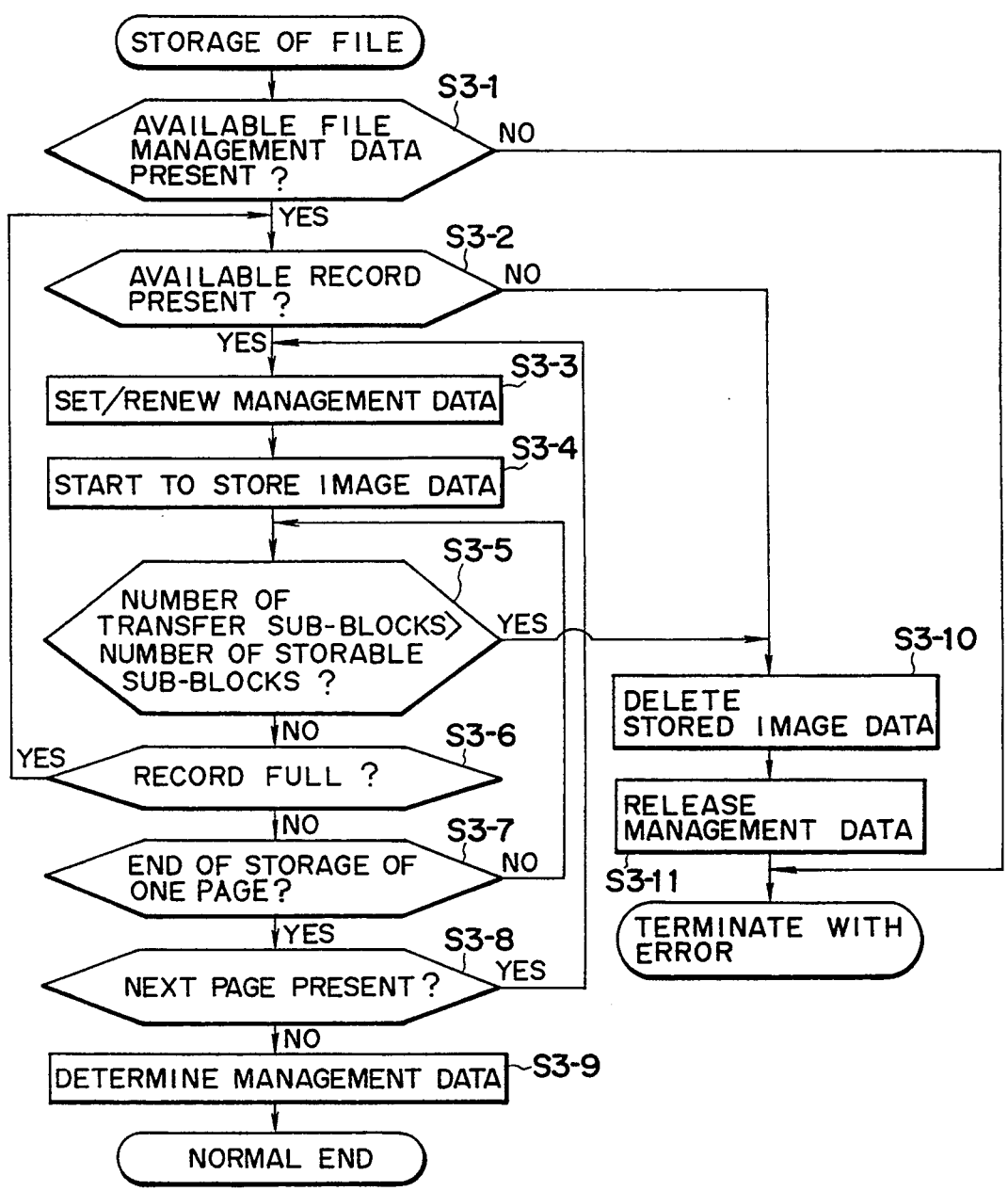
FIG. 3 is a flow chart showing storage processing to an image memory 30 in this embodiment.

FIG. 3 is a flow chart showing storage processing of the image data 31 for one file in the image memory 30 in this embodiment.

In FIG. 3, the file management data 45 is referred to check the presence/absence of available file management data (S3-1). If NO in step S3-1, the processing is terminated with an error; otherwise, the record chain 46 is referred to check the presence/absence of an available record (S3-2). If NO in step S3-2, it is determined that the image memory 30 overflows; otherwise, the leading address of the record is set in the image data address pointer 52. In addition, various values such as the storage start position in the file management data 45, the use state of the corresponding record in the record chain 46, and the like are set in the image management data 41 (S3-3).

When the storage operation (for one record) of the image data 31 is started (S3-4), the image data address pointer 52 is renewed as the storage operation progresses, and the number 54 of transfer sub-blocks is also renewed every time the sub-block is renewed. It is checked if the number 54 of transfer sub-blocks exceeds the number 53 of storable sub-blocks (S3-5). If NO in step S3-5, it is checked if the current record which is being subjected to the storage operation is filled with storage data (S3-6). If YES in step S3-6, the flow returns to step S3-2, and if the next record is present, the record chain 46 is renewed (S3-3). If NO in step S3-6, it is checked if an original for one page is ended (S3-7). If NO in step S3-7, the flow returns to step S3-5 to continue the storage operation. If YES in step S3-7, the presence/absence of the next original is checked (S3-8). If YES in step S3-8, the flow returns to step S3-3, and page data in the file management data 45 is renewed. If NO in step S3-8, an effective flag on the image memory, the storage end position, and the like in the file management data 45 are set to determine the image management data 41 (S3-9), and the storage processing is normally ended. A value obtained by subtracting the number 54 of transfer sub-blocks from the number 53 of storable sub-blocks is set in the number 53 of storable sub-blocks, and the number 54 of transfer sub-blocks is cleared.

In, e.g., a G3 reception mode, whether or not an original for one page is ended is determined in step S3-7 by checking if an RTC (return to control) in the CCITT recommendation T.4 is received. If the RTC is received, it is determined that the original for one page is ended. The presence/absence of the next original is determined in step S3-8 by checking if an EOP signal of post-message command signals in the CCITT recommendation T.30 is received. If the EOP signal is received, it is determined that the next original is absent.

If it is determined in step S3-2 that there is no available record, and the image memory 30 overflows, and if it is determined in step S3-5 that the number 54 of transfer sub-blocks exceeds the number 53 of storable sub-blocks, the stored image data 31 is deleted on the basis of the file management data 45 and the record chain 46 (S3-10). Thereafter, the corresponding file management data 45 and the record chain 46 are released (S3-11), and the number 54 of transfer sub-blocks is cleared, thus terminating the processing with an error. In, e.g., a substitution reception mode, a communication is immediately terminated with an error.

Figure 4:
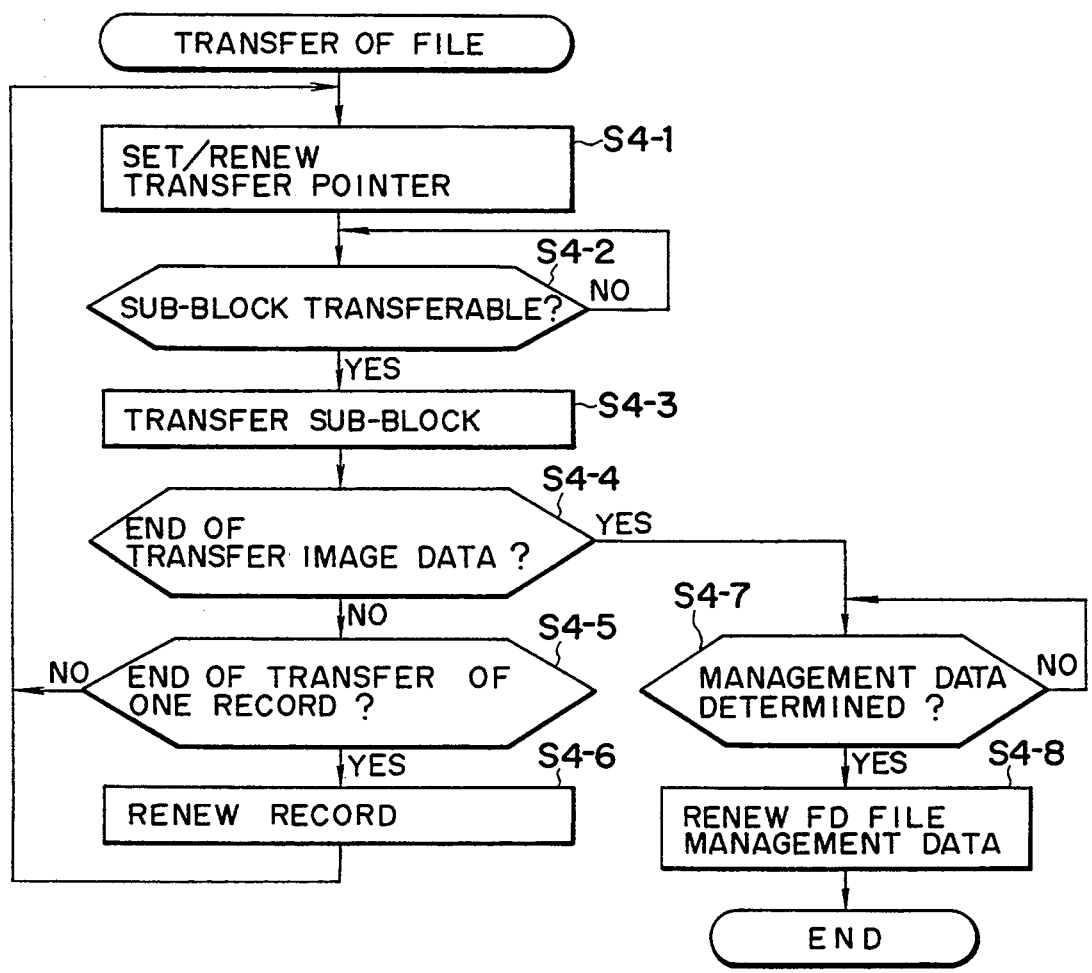
FIG. 4 is a flow chart showing transfer processing from the image memory 30 to an FD 20 in this embodiment.

FIG. 4 is a flow chart showing transfer processing of image data for one file from the image memory 30 to the FD 20 in this embodiment.

The leading sub-block of the leading record of a file to be transferred is set in the transfer pointer 51 (S4-1). If the sub-block indicated by the transfer pointer 51 is transferable (S4-2), the image data 31 is transferred from the image memory 30 to the FD 20 in units of blocks (S4-3). It is determined in step S4-2 that the sub-block is transferable when the image data address pointer 52 is dummy data indicating that the storage operation is not performed, or when no image data address pointer 52 is present in the sub-block indicated by the transfer pointer 51.

After the sub-block is transferred, it is checked if the image data 31 to be transferred is ended (S4-4). This checking operation is attained by discriminating if the end record and the end sub-block, which are indicated by the file management data 45 and the record chain 46 and store the image data 31, coincide with the currently transferred sub-block. If NO in step S4-4, it is checked if all the data for one record are transferred (S4-5). This checking operation is attained by discriminating if the currently transferred sub-block is the end sub-block in the record. If YES in step S4-5, the record chain 46 is referred to renew a record to the next record (S4-6), and the flow returns to step S4-1. In step S4-1, the leading sub-block of the renewed record is set in the transfer pointer 51. If data remains in the record, the flow returns to step S4-1 to renew the transfer pointer 51.

If it is determined in step S4-4 that the image data 31 to be transferred is not ended, an effective flag on the FD, the volume label of the FD 20, a file name, and the like in the file management data 45 are set, and the control waits until the image management data 41 is determined (S4-7). If the image management data 41 is determined, the file management data 22 in the FD 20 is renewed on the basis of the file management data 45 (S4-8), and the transfer processing of the image data 31 is ended.

Note that the storage processing shown in FIG. 3 and the transfer processing shown in FIG. 4 are different tasks, and these tasks can operate independently or simultaneously.

In this manner, the image data 31 and the image management data 41 are held without being deleted after they are transferred to the FD 20. When an image is output in, e.g., a substitution reception image print-out mode, the image data 31 is output based on the file management data 45 and the record chain 46. For this reason, high-speed processing can be performed as compared to a case wherein the FD image data 21 is output.

In this embodiment, processing for deleting image data in the image memory 30 and the FD 20 in, e.g., a substitution reception image output mode will be described below.

The file name of a file to be deleted in the FD 20, which file name is stored in the file management data 45, is stored in the control data storage memory 50. The image data 31 is deleted on the basis of the image management data 41, and thereafter, the image management data 41 is released. The FD file management data 22 is renewed on the basis of the file management data 45, and the FD image data 21 is deleted on the basis of the file name stored previously. Finally, the number of sub-blocks of the deleted FD image data 21 is added to the number 53 of storable sub-blocks, thus ending the delete processing.

Figure 5:
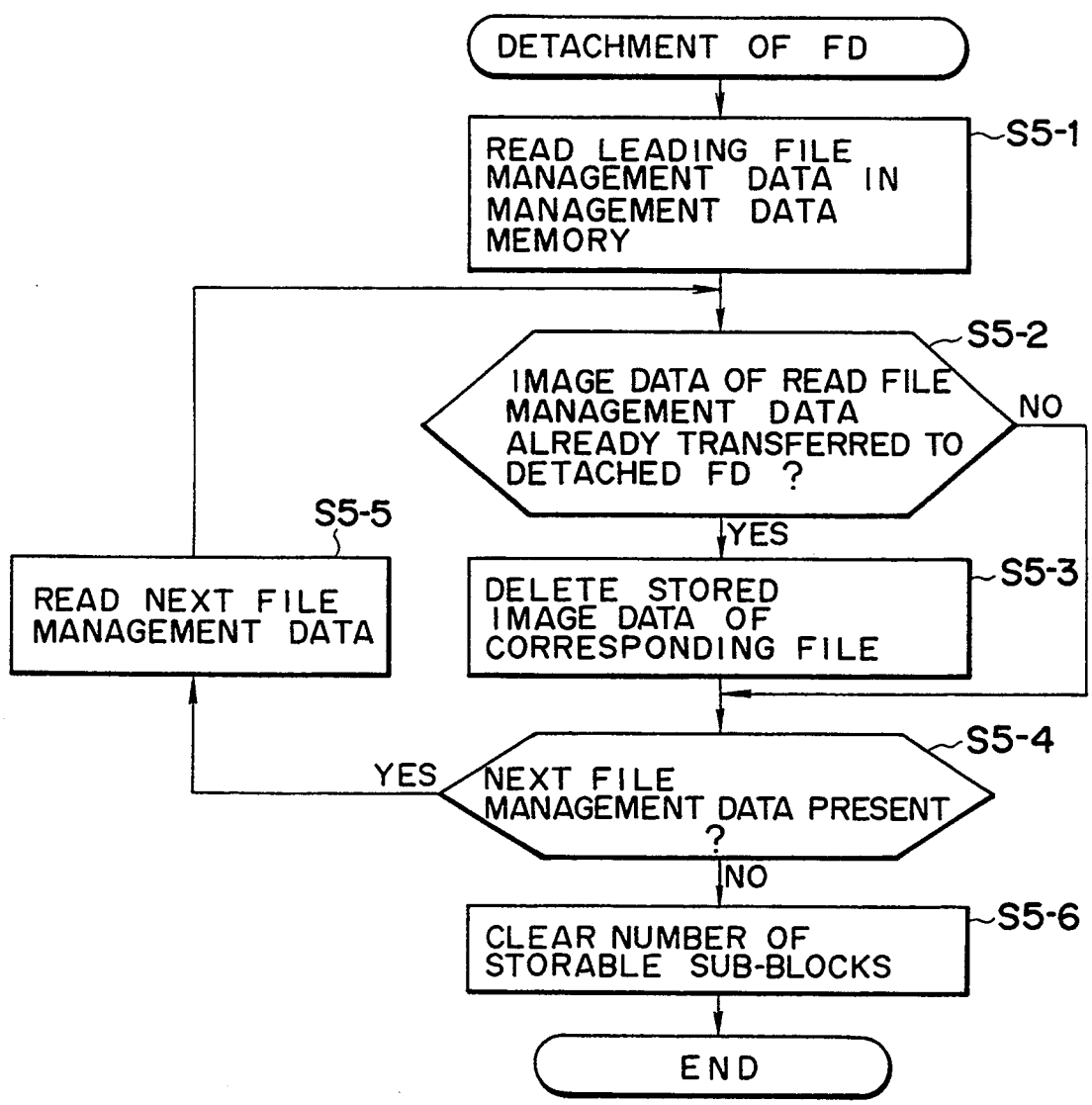
FIG. 5 is a flow chart showing detachment processing of the FD 20 in this embodiment.

FIG. 5 is a flow chart showing processing when the FD 20 is detached in this embodiment.

When it is determined based on the FD detect signal from the FD detector sensor 10s that the FD 20 is detached, the leading file management data is read from the file management data 45 (S5-1). It is then checked if the image data 31 of the corresponding file management data (to be referred to as corresponding file data hereinafter) has been transferred to the detached FD 20 (S5-2). It is determined that the image data has been transferred to the detached FD 20 when the effective flag on the FD of the corresponding file data is set, and the FD volume label stored in the corresponding file data coincides with the volume label 55 of the mounted FD. Only when it is determined that the image data has been transferred to the detached FD 20, the stored image data 31 is deleted on the basis of the corresponding file data and the record chain 46. Thereafter, the corresponding record chain 46 is released, and the file effective flag on the image memory 30 in the corresponding file data is cleared (S5-3). It is checked if the file management data 45 includes the next file management data (S5-4). If YES in step S5-4, the next file management data is read (S5-5), and the flow returns to step S5-2. However, if NO in step S5-4, the number 53 of storable sub-blocks is cleared to zero (S5-6), and the detachment processing is ended.

FIG. 6 is a flow chart showing processing when the FD 20 is inserted in this embodiment. Assume that the inserted FD 20 is formatted in a data read/write enable state.

When it is determined based on the FD detect signal from the FD detector sensor 10s that the FD 20 is inserted, a non-transfer flag in the control data storage memory 50 is set, and the volume label of the inserted FD 20 is stored in the volume label 55 of the mounted FD (S6-1). The presence/absence of the FD file management data 22 is checked (S6-2). If NO in step S6-2, the flow advances to step S6-11; otherwise, the leading FD file management data is read from the FD file management data 22 (S6-3). It is then checked if the FD image data 21 of the FD file management data (to be referred to as corresponding FD file data hereinafter) is present in the inserted FD 20 (S6-4). It is determined that the FD image data is present in the inserted FD 20 when the effective flag on the FD in the corresponding FD file data is set, and the FD volume label stored in the corresponding FD file data coincides with the volume label 55 of the mounted FD. If NO in step S6-4, the flow advances to step S6-9.

If YES in step S6-4, it is checked if file management data coinciding with the corresponding FD file data 21 is present in the file management data 45 (S6-5). If YES in step S6-5, whether or not image data has already been transferred is discriminated by checking if the file effective flag on the image memory 30 in the file management data is set (S6-6). If NO in step S6-6, the flow advances to step S6-8; otherwise, the flow advances to step S6-10. If it is determined in step S6-5 that no coinciding file management data is present, the file management data 45 is referred to discriminate the presence/absence of available file management data (S6-7). If YES in step S6-7, the flow advances to step S6-8; otherwise, the processing is terminated with a transfer error.

In step S6-8, data transfer from the FD 20 to the image memory 30 is performed as follows. The FD image data 21 is sequentially read out on the basis of FD file management data 22 and the FAT data, is transferred in units of sub-blocks, and is stored in the image memory 30. The data storage operation in the image memory 30 is performed in the same manner as in steps S3-2 to S3-9 in FIG. 3. In this case, the number 54 of transfer sub-blocks is not renewed, and the checking operation in step S3-5 is not performed. In step S3-9, the effective flag on the FD is set as well as the file effective flag on the image memory 30 in the file management data 45. If it is determined that there is no available record in step S3-2, and the image memory 30 overflows, a transfer error is determined in step S6-9, and image data of the file is deleted (S6-13), thus terminating the processing with the transfer error.

If no transfer error is detected (S6-9), it is checked if the FD file management data 22 includes the next FD file management data (S6-10). If YES in step S6-10, the next FD file management data is read (S6-12), and the flow returns to step S6-4. However, if NO in step S6-10, the number 53 of storable sub-blocks is calculated by the FAT, and the calculated number is set (S6-11). Then, the non-transfer flag is cleared, and the insertion processing is ended.

If it is determined in step S6-7 that there is no available file management data, and if it is determined in step S6-9 that the transfer error occurs, the processing is terminated with the transfer error while the non-transfer flag remains set. While the non-transfer flag is set, if available file management data or an available record is found after any processing, the processing in step S6-4 and subsequent steps is performed for the non-transferred file.

In the above-mentioned embodiment, an image stored in the FD 20 is a substitution reception image, but may be a memory transmission image. In this case, the end of an original for one page is discriminated in step S3-7 in FIG. 3 using, e.g., an original trailing end detection sensor, i.e., by checking if whether or not one original page is read. The presence/absence of the next original is discriminated in step S3-8 using, e.g., an original leading end detection sensor. When the processing is terminated with an error, a message indicating that data cannot be stored is alarmed to an operator through the display 6.

In the above-mentioned embodiment, when the FD 20 is detached, all the image data transferred to the FD 20 are deleted. Alternatively, some image data such as only transmission images or reception images may be deleted. In this case, the step of checking whether or not image data is deleted is inserted between steps S5-2 and S5-3 in FIG. 5. If the image data is deleted, the flow may advance to step S5-3; otherwise, the flow may advance to step S5-4.

Only the image data 31 transferred to the FD 20 is deleted when the FD 20 is detached. In this case, the corresponding file management data may be deleted at the same time, and may be reconstructed when the FD is inserted.

The present invention is not limited to the above-mentioned embodiment, and various modifications may be made.

What is claimed is:

1. An image communication apparatus, which stores image data in a first memory, and transfers the image data from the first memory to a detachable external storage medium, comprising:
   detection means for detecting an insertion/detachment state of said external storage medium;
   transfer means for transferring image data in said external storage medium to said first memory upon insertion of said external storage medium; and
   delete means for deleting the same image data stored in said first memory as the image data transferred from the first memory to said external storage medium upon detachment of said external storage medium.

2. An apparatus according to claim 1, further comprising a second memory for storing management data for managing the image data in said first memory, and wherein the image data is deleted according to the management data stored in said second memory.

3. An apparatus according to claim 1, wherein received image data is stored in said first memory, and thereafter, the image data is transferred from said first memory to said external storage medium.

4. An apparatus according to claim 1, further comprising:
   instruction means for issuing an instruction for deleting arbitrary image data in said external storage medium; and
   means for deleting the image data in said first memory and the image data in said external storage medium according to the instruction from said instruction means.

5. An apparatus according to claim 1, wherein said transfer means transfers some of image data stored in said external storage medium.

6. An apparatus according to claim 1, wherein said delete means deletes some of image data stored in said external storage medium.

7. An image communication apparatus comprising:
   means for generating image data;
   first memory means for storing the image data;
   a detachable external storage medium;
   transfer means for transferring the image data in said first memory means to said external storage medium, and transferring image data in said external storage medium to said first memory means;
   detection means for detecting an insertion/detachment state of said external storage medium; and
   delete means for deleting the image data in said first memory means,
   wherein said transfer means transfers the image data in said external storage medium to said first memory means upon insertion of said external storage medium, and
   said delete means deletes the same image data in said first memory means as the image data transferred from the first memory to said external storage medium, upon detachment of said external storage medium.

8. An apparatus according to claim 7, wherein said transfer means discriminates the presence/absence of image data in said external storage medium upon insertion of said external storage medium, and transfers the image data in said external storage medium to said first memory means according to the discrimination result.

9. An apparatus according to claim 7, further comprising a second memory for storing management data for managing the image data in said first memory, and wherein the image data is deleted according to the management data stored in said second memory.

10. An apparatus according to claim 7, further comprising:
   instruction means for issuing an instruction for deleting arbitrary image data in said external storage medium; and
   means for deleting the image data in said first memory and the image data in said external storage medium according to the instruction from said instruction means.

* * * * *